United States Patent
Wang et al.

(10) Patent No.: US 7,094,383 B2
(45) Date of Patent: Aug. 22, 2006

(54) METHOD FOR PREPARING PURE, THERMALLY STABLE AND HIGH SURFACE AREA CERIA

(75) Inventors: Feng-Yun Wang, Taipei (TW); Soofin Cheng, Taipei (TW)

(73) Assignee: CTCI Foundation, Taipei (TW)

( * ) Notice: Subject to any disclaimer, the term of this patent is extended or adjusted under 35 U.S.C. 154(b) by 114 days.

(21) Appl. No.: 10/905,085

(22) Filed: Dec. 14, 2004

(65) Prior Publication Data

US 2006/0127294 A1    Jun. 15, 2006

(51) Int. Cl.
*C01F 17/00* (2006.01)
(52) U.S. Cl. .............. 423/263; 423/593.1; 423/594.16; 423/21.1
(58) Field of Classification Search ............. 423/593.1, 423/594.16, 263, 21.1
See application file for complete search history.

(56) References Cited

U.S. PATENT DOCUMENTS

| 3,830,758 | A |  | 8/1974 | Snethorst et al. ........... 252/521 |
| 4,088,922 | A | * | 5/1978 | Wolfe ......................... 313/486 |
| 4,661,330 | A |  | 4/1987 | Chane-Ching et al. ...... 423/263 |
| 4,714,694 | A | * | 12/1987 | Wan et al. ................... 502/304 |
| 4,859,432 | A |  | 8/1989 | David et al. ................ 423/21.1 |
| 5,271,858 | A | * | 12/1993 | Clough et al. ................. 252/74 |
| RE36,573  | E | * | 2/2000 | Barrow et al. ........... 427/376.1 |
| 2004/0127351 | A1 | * | 7/2004 | Basile et al. ................. 502/303 |
| 2005/0142053 | A1 | * | 6/2005 | Takamura et al. .......... 423/263 |

FOREIGN PATENT DOCUMENTS

EP    0 444 470 A1    9/1991

* cited by examiner

*Primary Examiner*—Ngoc-Yen Nguyen
(74) *Attorney, Agent, or Firm*—Jiang Chyun IP Office

(57) ABSTRACT

A method for the preparing pure, thermally stable and high surface area ceria is described, wherein the ceria maintains a surface area of 12 m²/g after calcination at 980° C. in air for 4 hours. In the method, an aqueous solution containing $Ce^{3+}$, $Mg^{2+}$, organic acid and organic polymer is prepared and then evaporated to obtain a gel. The gel is calcined to obtain a mixed oxide, and then MgO is leached from the mixed oxide with a solvent to obtain raw ceria. The raw ceria is then washed, filtered and dried to obtain a ceria product.

13 Claims, 1 Drawing Sheet

METHOD FOR PREPARING PURE, THERMALLY STABLE AND HIGH SURFACE AREA CERIA

BACKGROUND OF THE INVENTION

1. Field of the Invention

This invention relates to a method for preparing pure, thermally stable and high surface area ceria. The ceria can be a catalyst, a catalyst support or incorporated into a catalytic washcoat.

2. Description of the Related Art

Automotive three-way catalytic converters are employed to convert pollutants produced by internal combustion engines into harmless emissions. The catalyst must be highly active for converting CO, NO and unburned hydrocarbons into nitrogen, carbon dioxide and water over a wide range of exhaust compositions. As a result, a noble metal catalyst that is usually platinum, rhodium and/or palladium must be employed. To utilize the noble metal efficiently, it is dispersed on a high surface area support such as γ-alumina typically having a surface area greater than 150 $m^2/g$. The high surface area support also provides a surface for the deposition of poisons like lead, zinc and phosphorus that are usually present in the exhaust gas. Since the catalyst may reach temperatures as high as 1000° C., the support must be thermally stable and resistant to sintering.

The composition of the engine exhaust gas oscillates between net oxidizing (lean) conditions for air/fuel ratios higher than the stoichiometric one and net reducing (rich) conditions for air/fuel ratios lower than the stoichiometric one. However, the catalyst operates most efficiently on a stoichiometric exhaust gas. Ceria is commonly added to three-way catalysts to promote the activity of the noble metals under these transient conditions; and similarly, $Ce^{4+}$ can be reduced to $Ce^{3+}$ under rich conditions. In this manner, ceria tends to dampen down oscillations in the exhaust gas stoichiometry.

Ceria may be incorporated into a three-way catalyst washcoat either by impregnation of the high surface area alumina support with a cerium salt or by physically mixing bulk cerium oxide with the other catalyst components. The addition of bulk ceria to the catalyst may be preferable since interactions between impregnated ceria and the alumina support decrease the oxygen storage capacity of the ceria. However, at the extreme temperatures (in excess of 1000° C.) often encountered in catalytic converters, ceria rapidly sinters to surface area of less than 5 $m^2/g$. Therefore, the incorporation of a thermally stable, high surface area ceria would prove beneficial to three-way catalyst performance.

U.S. Pat. No. 3,830,758 discloses the importance of using a high surface area support for palladium and platinum oxidation catalysts. Ceria with a purity of 98% was prepared by precipitation of cerium nitrate with ammonium hydroxide at a pH of 9. While the ceria had a high surface area of 218 $m^2/g$ after calcination at 427° C. in air for 4 hours, the surface area dropped to merely 4 $m^2/g$ following 4-hour calcination at 982° C.

U.S. Pat. No. 4,661,330 discloses a method for preparing high surface area and high purity ceria. Ammonium ceric nitrate is refluxed for 24 hours with ammonium sulfate to obtain a hydrous ceria powder. Following calcination at 538° C. in air, this material maintains a surface area of 150 $m^2/g$. However, the stability of this material at higher calcination temperatures was not investigated. In EP 0444470A1, pure ceria was prepared with the same method as in U.S. Pat. No. 4,661,330 for comparison. After calcination at 980° C. for 4 hours, the surface area of the prepared ceria remained only 5 $m^2/g$.

U.S. Pat. No. 4,859,432 teaches a method for preparing a morphologically improved ceria having high surface area. Ceria is produced by reacting a cerium salt with a strong base in the presence of carbonate ions followed by calcination. After calcination at 600° C., ceria with a surface area of 117 $m^2/g$ was obtained. Higher calcination temperatures were not investigated. In EP 0444470A1, pure ceria was prepared with the same method as in U.S. Pat. No. 4,859,432 for comparison. After calcination at 980° C. for 4 hours, the surface area of the prepared ceria remained only 1 $m^2/g$.

In EP 0444470A1, pure ceria was prepared by cerium nitrate decomposition at 538° C. in air for 1 h. After calcination at 980° C. for 4 h, the ceria remained a surface area of only 1.4 $m^2/g$.

Accordingly, the above products in the prior art all have relatively low surface areas after calcination at 980° C. for hours, so that the catalytic effect is poor.

SUMMARY OF THE INVENTION

In view of the foregoing, it is one object of this invention to produce a thermally stable and high surface area ceria.

It is another object of this invention to produce a high surface area ceria which is unusually resistant to sintering.

It is a further object of this invention to develop a new method by which high surface area ceria can be prepared.

The method for preparing ceria of high surface area includes the following steps. An aqueous solution containing $Ce^{3+}$, $Mg^{2+}$, organic acid and organic polymer is prepared and then evaporated to obtain a gel. The gel is calcined to obtain a mixed oxide, and MgO is leached from the mixed oxide with a solvent to obtain raw ceria. Then, the raw ceria is cleaned to obtain a ceria product, wherein the cleaning process may include ordinary washing, filtration and drying steps.

The ceria prepared with the above method is pure and thermally stable, and has high surface area. More specifically, the ceria maintains a surface area of over 12 $m^2/g$ as measured by the Brunauer-Emmett-Teller (BET) method following calcination at 980° C. in air for at least 4 hours.

It is to be understood that both the foregoing general description and the following detailed description are exemplary, and are intended to provide further explanation of the invention as claimed.

DESCRIPTION OF THE PREFERRED EMBODIMENTS

Figure 1:
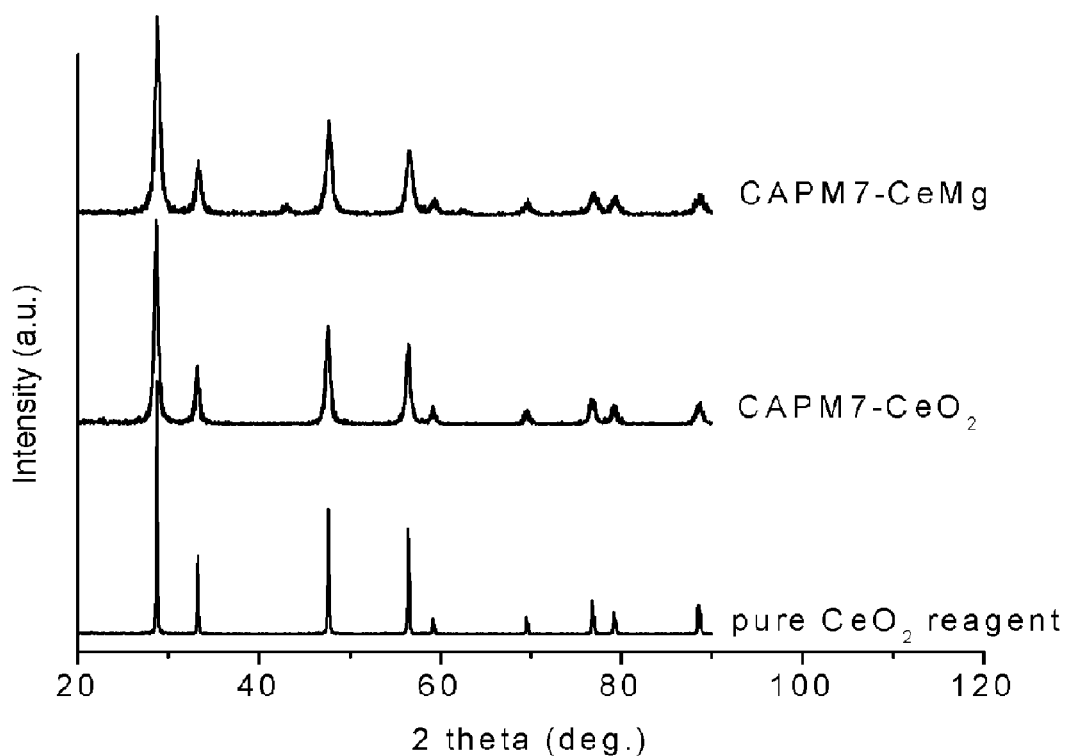
FIG. 1 shows the XRD patterns of pure $CeO_2$, CAPM7-CeMg and CAPM7-$CeO_2$, wherein CAPM7-$CeO_2$ is an example of high surface area ceria of this invention, and CAPM7-CeMg is the corresponding mixed oxide before leaching of MgO.

The method for preparing ceria of high surface area according to the preferred embodiment of this invention includes the following steps: 1) preparation of an aqueous solution containing $Ce^{3+}$, $Mg^{2+}$, organic acid and organic polymer; 2) evaporation of the mixed solution to obtain a gel; 3) calcination of the gel to obtain a mixed oxide; 4) leaching of MgO from the mixed oxide with a special solvent to obtain raw ceria; and 5) washing, filtrating and drying the raw ceria to obtain the ceria product.

The cerium precursor and magnesium precursor for preparing the aqueous solution containing $Ce^{3+}$, $Mg^{2+}$ may be selected from the salts of cerium and magnesium including chloride, nitrate, sulfate, acetate, oxalate and citrate salts, preferably nitrate and acetate salts, and more preferably nitrate salts. The organic acid may be selected from acetic acid, citric acid and glycine, preferably citric acid. The organic polymer may be polyethylene glycol (PEG) with molecular weight of 600–10000.

In addition, the evaporation step can be conducted at temperature of 30–110° C. The calcination step can be conducted at 400–1000° C. The leaching process may be carried out at 15–70° C. with a solvent selected from nitric acid of 0.1–5 wt %, $NH_4Cl$ solution of 1–10 wt %, acetic acid solution of 1–20 wt % and hydrogen chloride (HCl) solution of 0.1–5 wt %, preferably $NH_4Cl$ solution of 1–10 wt % and acetic acid solution of 1–20 wt %, and more preferably acetic acid solution of 1–20 wt %.

Having described the basic aspects of this invention, the following examples are given to illustrate specific embodiments thereof.

EXAMPLE 1

This example illustrates an exemplary procedure of the method of this invention. Firstly, $Ce(NO_3)_3 \cdot 6H_2O$, and $Mg(NO_3)_2 \cdot 6H_2O$ were used as starting materials to prepare respective metal-ion solutions. Each metal-ion solution is prepared by dissolving the nitrate salt into deionized water and then diluting the solution to give a concentration of 1.00 mol/L. A solution of citric acid (CA) and polyethylene glycol (PEG) with molecular weight of 600 was prepared by dissolving CA and PEG with a weight ratio (CA/PEG) of 60 into deionized water and then diluting the solution to form a solution containing citric acid of 2.00 mol/L. This solution is simply termed as CP solution.

The above CP solution and metal-ion solutions were used as basic solutions to prepare all the samples of the present invention unless others were mentioned.

In example 1, 20.00 ml of the $Ce^{3+}$ solution, 20.00 ml of the $Mg^{2+}$ solution and 20.00 ml of the CP solution were mixed in a 1000 ml beaker. The mixed solution was evaporated under stirring at 60–80° C. until it was gelled. The gel was dried at 105° C. and then calcined in air at 700° C. for 4 hours. The resulting powder was termed as CAPM7-CeMg. Thereafter, 4 g of the CAPM7-CeMg powder was taken for leaching reaction in a 500 ml beaker with 200 ml acetic acid solution of 0.5 mol/L under stirring at room temperature for 30 min. After the leaching reaction, the mixture in the beaker was filtered. The raw paste was washed with deionized water and filtered again. The filtrate was then taken for composition analysis. Subsequently, the washed paste was dried at 105° C. in air overnight, and was then calcined at 700° C. in air for 4 hours. The resulting solid product was termed as $CAPM7-CeO_2$.

The X-ray diffraction (XRD) pattern of CAPM7-CeMg, as shown in FIG. 1, is similar to that of pure $CeO_2$ except that a minor peak of MgO emerged at about 43°. Quantitative analysis with XRD found that the content of free MgO in CAPM7-CeMg was less than the total MgO content of 50 mol %. These results suggest that CAPM7-CeMg is composed of two phases, wherein one is $Mg^{2+}$-doped $CeO_2$ solid solution and the other is free MgO.

Composition analysis with inductively coupled plasma-atomic emission spectrometer (abbreviated to ICP hereinafter) showed that the molar ratio of $Mg^{2+}$ to $Ce^{n+}$ in the filtrate was larger than 776, indicating that the leaching process only led to removal of $Mg^{2+}$ from CAPM7-CeMg, while the dissolving of $CeO_2$ was negligible. Composition analysis with ICP also showed that the $CAPM7-CeO_2$ was pure $CeO_2$ with a purity higher than 99.9%. As shown in FIG. 1, the XRD pattern of $CAPM7-CeO_2$ was completely the same as pure $CeO_2$.

EXAMPLE 2

This example compares the ceria samples prepared with the method as described in Example 1 with those prepared with conventional methods, such as sol-gel method and precipitation method.

Two ceria samples were prepared with the same method as described in Example 1, except that the calcination temperature was changed to 500° C. or 980° C. According to the calcination temperature of 500° C. or 980° C., the two samples were termed as $CAPM5-CeO_2$ and $CAPM9.8-CeO_2$, respectively. Composition analysis showed that the two samples were all pure ceria with a purity higher than 99.9%.

Similar to the method described in example 1, three ceria samples, different only in calcination temperatures, were prepared with the sol-gel method as follows. Firstly, 20.00 ml of the $Ce^{3+}$ solution and 10.00 ml of the CP solution were mixed in a 1000 ml beaker. The mixed solution was evaporated under stirring at 60–80° C. until it was gelled. The gel was dried at 105° C. and then calcined at given temperature in air for 4 hours. According to the different calcination temperatures of 500° C., 700° C., and 980° C., the three ceria samples were termed as $CA5-CeO_2$, $CA7-CeO_2$ and $CA9.8-CeO_2$, respectively.

Another three ceria samples, different only in calcination temperature, were prepared with a precipitation method as follows. Firstly, 500 ml of $Ce^{3+}$ solution, which has a concentration of 0.1146 mol/L and is prepared with Ce $(NO_3)_3 \cdot 6H_2O$ and deionized water, and 500 ml of aqueous solution of ammonia ($NH_3$) in 2.9 wt % were simultaneously fed to a 2000 ml beaker which contained 100 ml of deionized water and was under stirring at 27° C. The pH value of the mixture in the beaker was maintained at about 7.8 by adjusting the relative feeding rate of the two solutions. After the $Ce^{3+}$ solution was fed up, the ammonia solution was kept on feeding until the pH value increased to about 8.9. The mixture was then aged at 27° C. under stirring for 53 h, washed with deionized water and filtered. The obtained paste was dried at 105° C. overnight and then calcined at given temperature in air for 4 h. According to the different calcination temperatures of 500° C., 700° C., and 980° C., the three samples obtained were termed as $P5-CeO_2$, $P7-CeO_2$ and $P9.8-CeO_2$, respectively.

Figure 2:
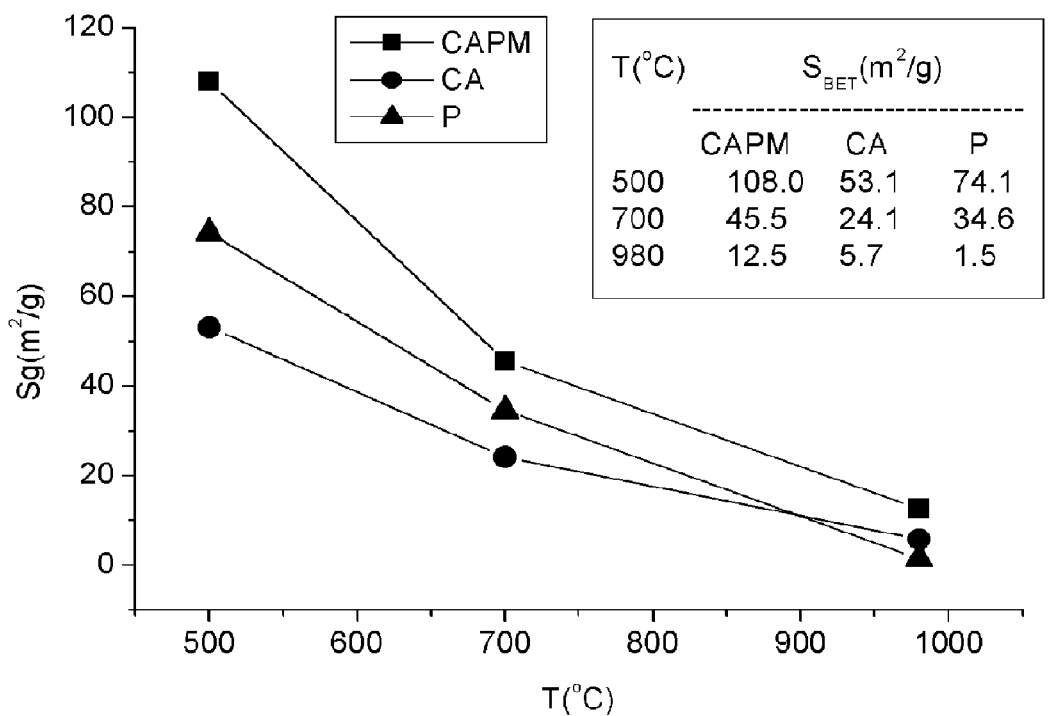
FIG. 2 shows the effect of calcination temperature on the specific surface areas of pure ceria materials prepared with the method of this invention (termed CAPM), sol-gel method (termed CA) and precipitation method (termed P), respectively.

FIG. 2 shows the specific surface areas of the samples prepared in this example and that prepared in Example 1. Obviously, the specific surface areas of the ceria samples prepared with the method of this invention were much higher than those with the conventional methods in the whole calcination temperature range. The specific surface areas of $CAPM-CeO_2$ were almost two times as high as those of $CA-CeO_2$ for all the calcination temperatures.

Table 1 compares the specific surface areas of ceria prepared with the method of this invention with those prepared with the conventional methods mentioned above and the methods of other prior patents. All the ceria samples in Table 1 were calcined at 980° C. for 4 h. In comparison to the above conventional methods and the methods of other prior patents, the method of this invention can be used to prepare pure ceria that maintains a much higher surface area following calcination in air at 980° C. for 4 h.

TABLE 1

| Preparation method | $S_{BET}$ (m²/g) | References |
|---|---|---|
| This invention | 12.5 | Disclosure of specification |
| Sol-gel | 5.7 | Disclosure of specification |
| Precipitation | 1.5 | Disclosure of specification |
| Ce(NO₃)₃/NH₄(OH) precipitation | 4 | U.S. Pat. No. 3,830,758 |
| Ce(NO₃)₃/(NH₄)₂SO₄ refluxing | 5 | U.S. Pat. No. 4661330, EP 0444470A1 |
| NaOH/cerium acetate precipitation | 1 | U.S. Pat. No. 4859432, EP 0444470A1 |
| Decomposition of cerium nitrate | 1.4 | EP 0444470A1 |

EXAMPLE 3

This example compares some ceria samples prepared with the same method of Example 1, wherein the molar ratio of $Ce(NO_3)_3 \cdot 6H_2O$ to $Mg(NO_3)_2 \cdot 6H_2O$ as starting materials to prepare metal-ion solution were varied within a range. To prepare each sample, the mixture of $Ce^{3+}$ and $Mg^{2+}$ solutions and CP solution was evaporated under stirring at 60~80° C. until it was gelled. The gel was dried at 105° C. and then calcined in air at 980° C. for 4 hours. Thus, four samples of composition "$Ce_{1-x}Mg_xO_{2-d}$" with the value of x being 0.1, 0.3, 0.5 and 0.7, respectively, were prepared.

Subsequently, the powder samples were taken for leaching reaction in a 500 ml beaker with 200 ml of acetic acid solution of 0.5 mol/L under stirring at room temperature for 30 min. After the leaching reaction, the mixture in the beaker was filtered. The raw paste was washed with deionized water and filtered again, and the filtrate was taken for composition analysis. The washed paste was dried at 105° C. in air overnight, and was then calcined at 980° C. in air again for 4 hours. Composition analysis showed that these four samples were all pure ceria with a purity higher than 99.9%. The BET surface areas of these samples were determined by nitrogen physical adsorption isotherm at liquid nitrogen temperature. The BET surface areas were 3.1, 4.0, 12.5 and 7.1 m²/g, respectively, for the four ceria samples derived from the mixed oxide of composition "$Ce_{1-x}Mg_xO_{2-d}$" with the value of x being 0.1, 0.3, 0.5 and 0.7, respectively. The oxygen number "2−d" varies with the amounts of $Ce^{3+}$ and $Ce^{4+}$ in the mixed oxide to keep charge balance.

Accordingly, the molar ratio of $Ce^{3+}$ to $Mg^{2+}$ in the mixed aqueous solution is preferably adjusted such that the molar fraction of magnesium in total metal content of the mixed oxide, i.e., the value of x in the composition "$Ce_{1-x}Mg_xO_{2-d}$", is between 0.1 and 0.7, more preferably 0.3–0.7, and still more preferably 0.5. The simplest way to control the molar fraction of magnesium in total metal content of the mixed oxide is to adjust the relative amounts of the $Ce^{3+}$ solution and the $Mg^{2+}$ solution of the same concentration as mentioned above.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A method for the preparing ceria of high surface area, comprising:
    preparing an aqueous solution containing $Ce^{3+}$, $Mg^{2+}$, organic acid and organic polymer;
    evaporating the aqueous solution to obtain a gel;
    calcining the gel to obtain a mixed oxide;
    leaching MgO from the mixed oxide with a solvent to obtain raw ceria; and
    cleaning the raw ceria to obtain a ceria product.

2. The method of claim 1, wherein the aqueous solution containing $Ce^{3+}$ and $Mg^{2+}$ is prepared with a cerium precursor and a magnesium precursor selected from the group consisting of chloride, nitrate, sulfate, acetate, oxalate and citrate salts of cerium and magnesium.

3. The method of claim 1, wherein the aqueous solution containing $Ce^{3+}$ and $Mg^{2+}$ is prepared with a cerium precursor and a magnesium precursor selected from the group consisting of nitrate and acetate salts of cerium and magnesium.

4. The method of claim 1, wherein the aqueous solution containing $Ce^{3+}$ and $Mg^{2+}$ is prepared with cerium nitrate and magnesium nitrate.

5. The method of claim 1, wherein the molar ratio of $Ce^{+3}$ to $Mg^{+2}$ in the aqueous solution is adjusted so that composition of the mixed oxide is $Ce_{1-x}Mg_xO_{2-d}$, x is from 0.1 to 0.7 and 2−d varies with the amount of $Ce^{+3}$ and $Ce^{+4}$ in the mixed oxide to keep charge balance.

6. The method of claim 1, wherein the molar ratio of $Ce^{+3}$ to $Mg^{+2}$ in the aqueous solution is adjusted so that composition of the mixed oxide is $Ce_{1-x}Mg_xO_{2-d}$, x is from 0.3 to 0.7 and 2−d varies with the amounts of $Ce^{+3}$ and $Ce^{+4}$ in the mixed oxide to keep charge balance.

7. The method of claim 1, wherein the molar ratio of $Ce^{+3}$ to $Mg^{+2}$ in the aqueous solution is adjusted so that composition of the mixed oxide is $Ce_{0.5}Mg_{0.5}O_{2-d}$, 2−d varies with the amounts of $Ce^{+3}$ and $Ce^{+4}$ in the mixed oxide to keep charge balance.

8. The method of claim 1, wherein the organic acid is selected from the group consisting of acetic acid, citric acid and glycine.

9. The method of claim 1, wherein the organic acid is citric acid.

10. The method of claim 1, wherein the organic polymer comprises polyethylene glycol (PEG) with molecular weight of 600–10000.

11. The method of claim 1, wherein the step of evaporating the aqueous solution is conducted at temperature of 30–110° C.

12. The method of claim 1, wherein the step of calcining the gel is conducted at temperature of 400–1000° C.

13. The method of claim 1, wherein the step of leaching MgO is carried out at 15–70° C. with a solvent selected from the group consisting of nitric acid of 0.1–5 wt %, NH₄Cl solution of 1–10 wt %, acetic acid solution of 1–20 wt % and HCl solution of 0.1–5 wt %.

* * * * *